UNITED STATES PATENT OFFICE.

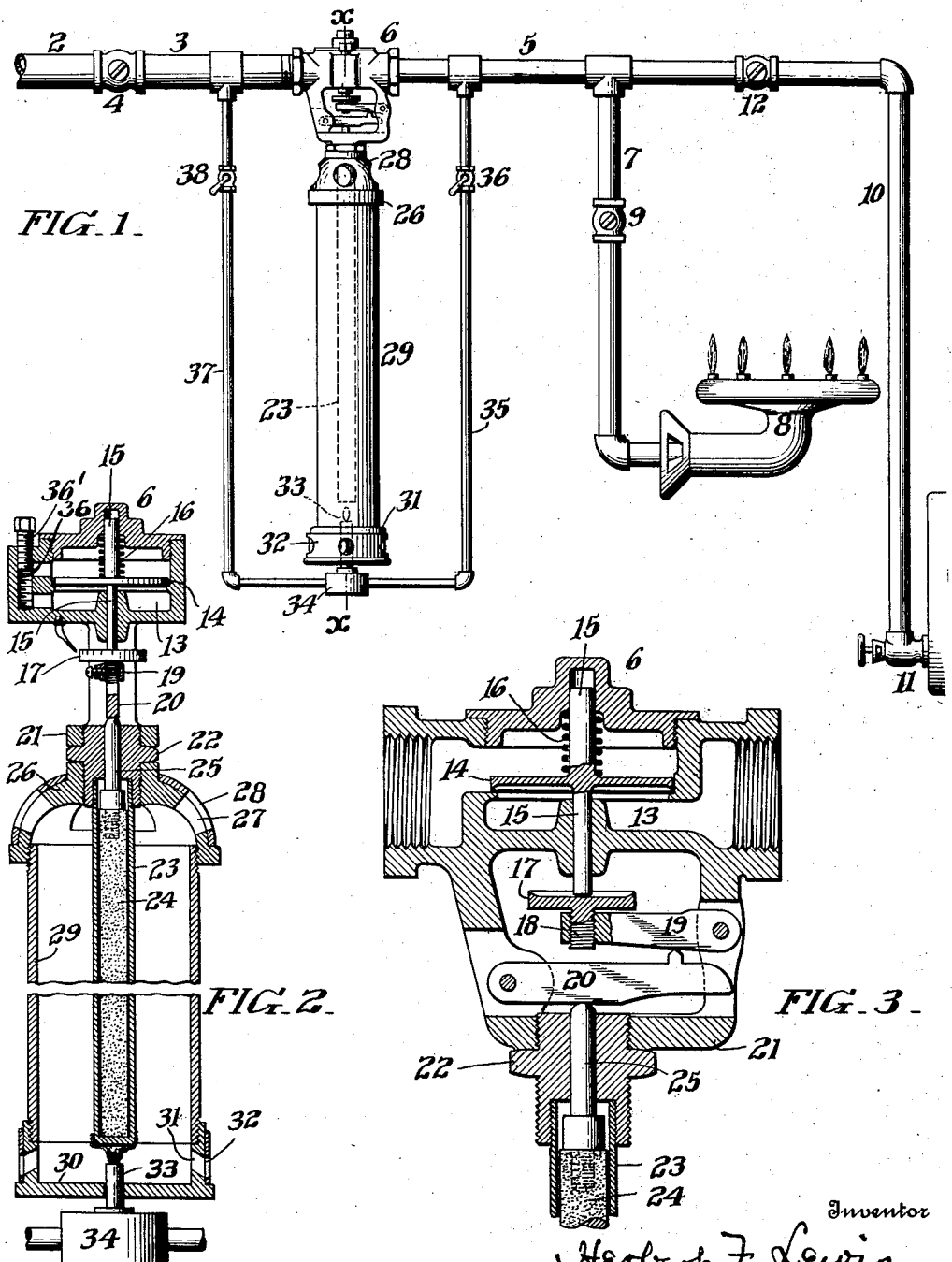

HERBERT F. LEWIS, OF PHILADELPHIA, PENNSYLVANIA.

AUTOMATIC REGULATOR FOR GAS SYSTEMS.

1,236,953.　　　Specification of Letters Patent.　　Patented Aug. 14, 1917.

Application filed November 18, 1913. Serial No. 801,606.

*To all whom it may concern:*

Be it known that I, HERBERT F. LEWIS, citizen of the United States, and resident of Philadelphia, county of Philadelphia, and State of Pennsylvania, have invented an Improvement in Automatic Regulators for Gas Systems, of which the following is a specification.

The object of my invention is to provide a system for regulating the supply of gaseous fuel whereby the same may be supplied to the various burners, heaters or furnaces under a normally constant pressure, so that the temperature conditions of any such burner, heater or furnace may be maintained substantially constant. My improvements are especially useful in commercial operations where gas is employed as the heating medium in the chemical or physical processes which are employed in industrial processes, such as in chemical works or in those plants where constant temperatures are practically necessary for successful results. By insuring a constant pressure in the distributing main, irrespective of the number of burners, heaters or furnaces which may be drawing supply from said main, and irrespective of the shutting off or turning on of one or more of the said burners, heaters or furnaces, less than the whole, it is possible to maintain any particular operation in the plant, dependent upon the gas supply through said main, under practically constant conditions, thereby insuring both accurate and economical results. Aside from the special advantages in respect to the use of my improvements for maintenance of constant temperature in physical or chemical processes generally, it is also of material importance in respect to metallurgical operations in which very high temperatures are required and maintained substantially constant.

Broadly considered, my invention comprehends the employment of a thermostatically operated means for throttling the flow of gas between the main supply pipe and the distributing pipe to the burners, heaters or furnaces, whereby the pressure in the distributing pipe may be normally maintained at a different pressure from that in the main or supply pipe; and moreover, wherein the pressure in the distributing pipe may remain normally constant irrespective of any variations in pressure which may take place in the said main or supply pipe; and in which further, the thermostatically operated means is itself controlled by devices which regulate the degree of expansion or contraction of its thermostatic member under the control of the variation of the pressure of the gas flowing through the thermostatically operated means, and more particularly in a manner commensurate with the temporary variations in the pressure of the gas in the distributing main due to any turning on or shutting off of burners, heaters or furnaces, or either of them which may be supplied from the said distributing main.

More specifically, my invention comprehends the gas supply main and the distributing main leading to the burners, heaters or furnaces, combined with a pressure controlling valve thermostatically operated, and with or without an associated by-pass, and a pilot light for supplying heat to the thermostatic member of the control valve, said pilot light being supplied with gas taken from the main or mains preferably adjacent to the control valve, whereby fluctuations in the gas pressures being thus controlled, will vary the temperature of the pilot light and thereby actuate the thermostatic member to adjust the control valve.

My invention also comprehends various details of construction which, together with the features above specified, will be better understood by reference to the drawings, in which:

Figure 1 is an elevation illustrating the arrangement of the various parts making up my improved system of gas fuel regulation; Fig. 2 is a vertical section through the thermostatically controlled valve device; and Fig. 3 is a sectional view of the valve portion of the thermostatically operated valve device.

2 designates a gas supply pipe connected with any suitable source of supply, connected to the pipe 3 through the shut-off valve 4 and adapted to supply gas to the distributing pipe 5, which latter may be tapped at a number of points to furnish gas to a furnace or furnaces, as the case may be. As here shown, the pipe 7 leads from the distributing pipe 5 to a burner 8 which may serve as a heating medium for any desired mechanism, and the same is controlled by the shut-off valve 9. The pipe 10 also leads from the distributing pipe 5 and is adapted to supply gas to a burner 11 which supply is controlled by a suitable shut-off valve 12 as shown. 6 designates an automatic valve located between the supply pipe 2 and the distributing pipe 5, and adapted to control the supply of gas to the burners which receive their gas supply from the distributing pipe 5. The valve 6 in the present instance is thermostatically controlled in such a manner as to furnish sufficient gas at all times to the distributing pipe 5 and maintain a constant pressure irrespective of the varying conditions in the said pipe 5, due to changes in the number of burners or furnaces in use. Thus, for example, should the distributing pipe 5 be receiving a sufficient supply of gas under normal conditions to take care of the burner 8, and the valve 12 be opened to start the burner 11, there will, of course be an immediate call upon the distributing pipe for more gas and the action of the automatic thermostatic valve will be such as to substantially instantaneously increase the supply of gas to meet the new conditions in the distributing line.

The thermostatically operated valve 6 may be made in any suitable manner, as I do not restrict myself in this respect, but by way of example I have shown a construction for this valve which I have found well adapted for the purposes of my invention, and I will now briefly describe the same, having particular reference to Figs. 2 and 3.

13 designates a valve controlled thoroughfare located between the inlet of the valve body from the pipe 3 and the outlet to the distributing pipe 5, and controlled by the valve piece 14 which, as will be readily understood, is adapted to open and close the thoroughfare 13. This valve piece 14 has a stem 15 secured thereto, which extends both above and below the valve piece, the upper portion of which is guided in the casing cap or bonnet and surrounded by a spring 16 for forcing the valve piece 14 toward its seat to shut off the flow, while the lower portion of the stem 15 extends downwardly through the body in position to contact with the disk head 17 of an adjusting screw 18. This adjusting screw 18 is screwed into the end of an arm 19 pivoted to a suitable part of the valve body, so that the screw may be moved bodily up or down. The arm 19 in turn is supported on the contacting knife edge of a pivoted lever 20 which is also pivoted to the casing head 21. 22 designates a nipple threaded into the head 21 and forming an apertured cap to receive the end of an expansible metal tube 23, the lower end of which is permanently closed. This tube is preferably of copper, though any other metal suitable for the purpose may of course be employed. The tube 23 incloses a rod 24 of carbon or other less expansible material or composition, which seats upon the bottom of the said tube and carries upon its upper end a pin 25 which is guided by the opening in the nipple 22, and extends through the same into contact relation with the lever 20, and therefore any variation in the length of the tube with respect to the rod will cause the pin 25 to move longitudinally and vary the relation between the valve parts. It will now be understood that when the members 23 and 24 expand, they conjointly act through the levers 19 and 20 and the head 17 to lower the valve piece 14 so that the flow of gas through the valve is restricted, thereby cutting down the supply of gas to the distributing pipe 5. If, on the contrary, the thermostatic members 23 and 24 are contracted, the reverse action will take place and the valve piece 14 opened to a greater extent and thus causing an increased flow of gas to meet the increased demand upon the distributing pipe 5.

26 designates a head secured to the nipple 22 and provided with a plurality of openings 27 which are controlled by a rotatable slide valve 28 which regulates the amount of opening for the passage of air or products of combustion through the head 26. The head 26 is connected to an inclosing casing or shell 29 surrounding the thermostatic members 23 and 24, and carrying on its lower end a bottom head 30 provided with openings 31 which are controlled by the rotatable slide valve member 32. 33 designates a small burner or pilot projecting through the head 30 in suitable operative relation to the thermostatic members and having communication with the fitting 34, which latter is supplied by gas in the present instance, from the by-pass pipes 35 and 37, the former of which is connected to the distributing pipe 5, and controlled by the shut-off valve 36, while the latter connects to the pipe 3 and is controlled by the shut-off valve 38. It will thus be noted that the pilot light 33 may either receive its gas from the inlet side of the thermostatic valve 6, or from the outlet side thereof, and the amount of gas supplied to the said light will thus be either proportioned to the supply pressure or the distributing pressure.

In describing the operation of the device it will be assumed that the adjusting head 17 has been set so that the valve 14 under conditions of minimum supply will be open the required amount, and the pilot light is burning under a supply of gas from the by-pass pipes 35 and 37, and the pressure thereof is of course properly regulated by adjusting the valves 36 and 38. With this condition in mind and the burner 8 in operation, and the pressure of the main gas supply pipe assumed to remain constant, the pressure of the gas in the distributing line 5 will also be maintained constant, though slightly lower than the main supply. In case the burner or furnace 11 is brought into operation by opening the valve 12, there will be a sudden demand and rush of gas in the distributing pipe 5, which will draw gas from the by-pass pipe 35, thus diminishing the pilot flame. This action causes the thermostat members 23 and 24 to contract and move the pin 25 so that the lever 19 brings the head 17 into contact with the stem 15 of the valve 14, and the latter is thereupon opened to a greater extent and permits an increased flow of gas to the distributing line 5. The effect of this is to momentarily reduce the pressure in the pipe 3 so that the pressure at the pilot burner 34 will be reduced and hence the flame is also reduced, thereby causing the valve 14 to have an increased opening to allow greater flow and whereby the pressure in pipe 5 will be restored to substantially the former or working pressure. In this manner, the additional burner on the distributing pipe 5 is supplied with the required quantity of gas and conditions assume the normal in which there will be constant pressures upon each side of the thermostatic valve 6, and the predetermined differential between them will be automatically maintained by the thermostatic valve devices. Should, however, one of the burners as 8 or 11 be cut off, the additional amount of gas will be immediately taken up by the pilot light, increasing its flame so that the thermostatic members are expanded to move the valve 14 so that the supply of gas is cut down to the distributing line, and the apparatus continues working as before, being, of course, at all times subject to automatic operation controlled by variations in the pressure in the distributing main or of the gas as it passes through the thoroughfare 13. It will thus be seen that an increase in the supply pressure will result in an increased pressure at the pilot burner 34 and a corresponding reduction in the opening of the valve 14, the effect of which is to reduce or substantially eliminate the effect upon the discharge pressure of the increase in the supply pressure. The effect of a reduction in the supply pressure will be to increase the opening of valve 14 and hence maintain the flow of an outward pressure substantially as before.

By the means shown, the thermostatic member is controlled by the variations of the temperature of the pilot light 33 whether supplied with gas by the by-pass pipe 37 or pipe 35, because the gas pressure in both of these pipes is varied commensurately with any variation in pressure of the distributing main 5, this being due to the fact that a lowering of the gas pressure in main 5 would lower the gas pressure in the pipe 3 adjacent to the inlet of the thermostatically operated valve 6. The gas pipe 37 supplying the pilot burner also performs the function of preventing the pilot light from being put out by any sudden abnormal demand for gas in the distributing main or by lack of gas when the various burner units of the distributing main were shut off, with the result that the thermostatically operated valve 6 would close thus shutting off gas to the pilot light by pipe 35. In cases where the valve 6 is provided with a by-pass 36 about the valve controlled thoroughfare 13 the pipe 35 may be used alone, as in this case there will be insured a continuous supply of gas even when the valve 14 is closed. This by-pass 36 may be manually adjusted by a valve 36' to regulate the amount of opening so as to insure the minimum flow of gas, whereas the maximum and excess above the minimum being automatically controlled by the thermostatically operated valve piece 14.

The provision of the valves 28 and 32 for the casing about the thermostatic member and the pilot burner enables the pilot light to accomplish its purpose more accurately and economically than would be the case if it was exposed to drafts in a more exposed condition. The pilot light and thermostatic members being surrounded by an inclosing chamber, the variations in heat due to the pilot light fluctuations is more effective upon the thermostatic elements and hence they respond to changes more readily. The pilot light is also more effectively protected against being blown out.

While I prefer the use of the two by-pass pipes 35 and 37 for the pilot burner, as adapted to meet all requirements under all conditions, I may if so desired omit either the pipe 35 or pipe 37, as preferred, as in either case the variations in the distributing pipe pressure would affect the pilot light in the proper manner.

The distributing pipe 5 may supply gas for any purpose, whether for light, heat or power, and in illustrating the two burners 8 and 11, this is by way of example only and as showing a plurality of gas consuming units. I therefore desire it to be understood that I do not restrict myself in any manner as to the special use of the gas constituting the demand upon the distributing pipe 5.

I have described my invention in respect to the form which I have found excellently adapted for the purposes of the invention in actual use, but I do not restrict myself to the details here shown and described as my invention comprehends broadly any thermostatically operated controlling device for securing a maintenance of a different and substantially constant pressure in the distributing main irrespective of the pressure, whether constant or variable, in the supply main; and it is also to be understood that while I have shown a special arrangement of pilot burner for the purpose of producing a variable heating of the expansible or thermostatic member of the control valve, the temperature of the pilot burner regulated by the variations in pressure of the gas passing through the thermostatically controlled valve, I do not restrict myself to such means, as any device or means which will accomplish the same results under the regulation of the temporary fluctuations in pressure of the gas being delivered into the distributing main and adjacent to the thermostatically controlled valve or at any place in the distributing main, will be equally within the spirit of my invention, because the essential features of the invention would be broadly provided by any means which would control the temperature of the thermostatically operated member under fluctuations of gas supply to the distributing main which would produce temporary variation of pressure therein. In this application I make no claim to the method as that is reserved for a separate application.

Having thus described my invention, what I claim and desire to protect by Letters Patent is:—

1. In apparatus of the character stated, a main supply pipe combined with a distributing pipe, a plurality of burner units connected to said distributing pipe and independently operable and controlled, a valve to control the supply and pressure of the gas in the distributing pipe from the main supply pipe, a thermostatic member to operate said valve, a draft flue surrounding the thermostatic member and having escape ports at the top for escape of heated products and air intake ports at the bottom for the admission of air, a pilot light arranged in the bottom of the draft casing to heat the inflowing air whereby the heated air passes upward about the thermostatic member to control its operation, a pipe for supplying the pilot light with gas and having communication with the system adjacent to the control valve, and means for controlling the extent of draft through the draft casing.

2. In an apparatus of the character stated, a main supply pipe, a distributing pipe, a plurality of units connected to said distributing pipe and independently controlled and operable, a valve between said main supply pipe and said distributing pipe for controlling the flow of gas to said distributing pipe, a thermostat for automatically actuating said valve, a pilot light operatively positioned with respect to said thermostat, a by-pass pipe for delivering gas to said pilot light, the supply of gas in said by-pass being subject to variations in the velocity of the gas supplied from the main supply pipe adjacent to the controlling valve, and means to regulate the quantity of gas in said by-pass.

3. In an apparatus of the character stated, a main supply pipe, a distributing pipe, a plurality of heat generating units connected to said distributing pipe and independently controlled and operable, a valve between the main supply pipe and distributing pipe for controlling the flow of gas to the distributing pipe, a thermostat to control the operation of the valve, a pilot light operatively arranged to heat said thermostat, and a plurality of by-pass pipes having said pilot light as a common discharge, said by-pass pipes respectively in communication with the main gas supply pipe close to the valve and with the distributing pipe, said thermostat actuated by variations of temperature of said pilot light for automatically controlling the valve and maintaining a substantially constant gas pressure condition in said distributing pipe irrespective of the number of said units in operation.

4. In an apparatus of the character stated, a main supply pipe, a distributing pipe, a plurality of burner units connected to said distributing pipe and independently operable and controlled, a valve between said main supply pipe and said distributing pipe for controlling the flow of gas to said distributing pipe, a thermostatically controlled means for automatically actuating said valve, a by-pass pipe for delivering gas from said main supply pipe to a point adjacent said thermostatically controlled means, an auxiliary by-pass pipe for delivering gas from said distributing pipe to a point also adjacent said thermostatically controlled means, and means controlled by variations in pressure in said by-pass pipes and each of them for controlling the thermostatic member of said thermostatically controlled means, whereby a substantially constant gas pressure condition is automatically maintained in said distributing pipe irrespective of variations in the number of said units in operation.

In testimony of which invention, I hereunto set my hand.

HERBERT F. LEWIS.

Witnesses:
R. M. HUNTER,
FLORENCE DEACON.